United States Patent [19]

Heithorn et al.

[11] Patent Number: 5,256,453
[45] Date of Patent: Oct. 26, 1993

[54] PROCESS FOR THE PRODUCTION OF A MULTI-LAYER PAINT COATING AND BASE PAINT FOR THE BASE COAT OF A MULTI-LAYER PAINT COATING

[75] Inventors: Monika Heithorn, Senden; Stefan Wieditz, Sylvania; Gerold Mahr, Münster; Arnold Dobbelstein, deceased, late of Münster, all of Fed. Rep. of Germany, by Hildegard Dobbelstein executor

[73] Assignee: BASF Lacke + Farben Aktiengesellschaft, Münster, Fed. Rep. of Germany

[21] Appl. No.: 793,413

[22] PCT Filed: Jun. 22, 1990

[86] PCT No.: PCT/EP90/00994
§ 371 Date: Dec. 31, 1991
§ 102(e) Date: Dec. 31, 1991

[87] PCT Pub. No.: WO91/00895
PCT Pub. Date: Jan. 24, 1991

[30] Foreign Application Priority Data

Jul. 7, 1989 [DE] Fed. Rep. of Germany ....... 3922363

[51] Int. Cl.$^5$ ............................ B05D 1/36; C08L 1/14
[52] U.S. Cl. ...................................... 427/415; 524/38; 524/114; 427/407.1; 427/409; 427/417

[58] Field of Search ............... 427/407.1, 409, 415, 427/417, 388.2; 524/38, 114

[56] References Cited

U.S. PATENT DOCUMENTS

| | | | |
|---|---|---|---|
| 3,639,147 | 2/1972 | Benefiel et al. | 427/389.7 |
| 3,657,001 | 4/1972 | Parker | 427/388.3 |
| 3,862,062 | 1/1975 | Harper | 427/389.7 |
| 4,242,384 | 12/1980 | Andrew et al | 427/388.2 |
| 4,322,325 | 3/1982 | Esser et al. | 427/407.1 |
| 4,416,917 | 11/1983 | France et al. | 427/386 |
| 4,477,536 | 10/1984 | Wright et al. | 427/407.1 |
| 4,728,543 | 3/1988 | Kurauchi et al. | 427/407.1 |
| 4,728,545 | 3/1988 | Kurauchi et al. | 427/407.1 |

*Primary Examiner*—Shrive Beck
*Assistant Examiner*—Diana L. Dudash
*Attorney, Agent, or Firm*—Frank C. Werner; Paul L. Marshall

[57] ABSTRACT

A process for the production of a multi-layer paint coating in which base paints are employed which contain 5 to 20% by weight of crosslinked polymer microparticles, 2 to 15% by weight of a cellulose ester and 5 to 20% by weight of an epoxidized fatty acid ester, the weight percentages relating to the total content of nonvolatile constituents, excluding pigments and inorganic fillers, and the cellulose ester being so selected that a solution of 15 parts by weight of the cellulose ester in 85 parts by weight of a 9:1 mixture of acetone and ethanol at 23° C. has a viscosity of 200 to 600 mPa.s.

7 Claims, No Drawings

PROCESS FOR THE PRODUCTION OF A MULTI-LAYER PAINT COATING AND BASE PAINT FOR THE BASE COAT OF A MULTI-LAYER PAINT COATING

BACKGROUND OF THE INVENTION

The invention relates to a process for the production of a multi-layer paint coating on the surface of a substrate, in which (1) a pigmented base paint containing crosslinked polymer microparticles and a cellulose ester is applied to the surface of the substrate (2) a polymer film is formed from the composition applied in stage (1)

(3) a transparent finish is applied to the base coat thus obtained, and then (4) the base coat is baked, together with the cover coat.

The invention also relates to a base paint for the production of the base coat of a multi-layer paint coating.

The process for production of a multi-layer paint coating on the surface of a substrate has already been known for a long time and is also described, for example, in U.S. Pat. No. 4,477,536.

It is a declared aim of the manufacturers of paint to reduce as far as at all possible the content of organic solvents, particularly in the base paints for the production of multi-layer paint coatings. The associated increase in the proportion of nonvolatile constituents results in an increase in the viscosity. When the viscosity under application conditions exceeds a certain limit, paint coatings having considerable disadvantages (blushing, poor metallic effect and poor appearance . . . ) are obtained On the other hand, the addition of substances which, by virtue of their relatively low molecular weight, only cause a relatively low increase in the viscosity results, as a rule, in inferior paint coatings, because the transparent finish incipiently dissolves the base paint (the base paint and the finish are applied by the wet-on-wet process).

The object on which the present invention is based consists, accordingly, in providing base paints which have as high a content as possible of nonvolatile constituents, without the occurrence of the above-mentioned problems.

SUMMARY OF THE INVENTION

This object is achieved, surprisingly, by the use of base paints which contain 5 to 20, preferably 7 to 15, percent by weight of crosslinked polymer microparticles, 2 to 15, preferably 4 to 13, percent by weight of a cellulose ester or of a mixture of at least two types of cellulose ester having different molecular weight distributions, and 5 to 20, preferably 7 to 15, percent by weight of an epoxidized fatty acid ester or of a mixture of epoxidized fatty acid esters, in which the weight percentages relate to the total content of nonvolatile constituents, excluding pigments and inorganic fillers, and the cellulose ester or the mixture of cellulose esters is so selected that a solution of 15 parts by weight of the cellulose ester or of a mixture of at least two cellulose esters in 85 parts by weight of a mixture of acetone and ethanol (ratio by weight of acetone to ethanol=9:1) at 23° C. has a viscosity of 200 to 600, preferably 300 to 500, mPa.s It is known to employ epoxidized fatty acid esters in base paints free from polymer microparticles, particularly for improving the absorption of spray dust. The addition of epoxidized fatty acid esters to base paints free from polymer microparticles results, even when relatively small amounts are added, in the incipient dissolution problems described above, which are more or less visible depending on the color shade of the base paint.

It is surprising that it is possible, by means of a combination of crosslinked polymer microparticles with a cellulose ester or a mixture of cellulose esters in which the cellulose ester component exhibits a certain viscosity behavior, and an epoxidized fatty acid ester, to obtain base paints which, in spite of an increased content of nonvolatile constituents, are very reliable in application and afford two-layer paint coatings which exhibit no disadvantages due to incipient dissolution processes and, in addition, are also distinguished by an improved clear coat hold out and an improved resistance to chemicals. A further advantage of the base paints according to the invention lies in the fact that the cover over unevenness in the underlying layer of filler particularly well, which results in good clear coat hold out.

DETAILED DESCRIPTION OF THE INVENTION

In addition to the cellulose ester, the epoxidized fatty acid ester and the polymer microparticles, the base paints employed in accordance with the invention also contain at least one binder, preferably in combination with a crosslinking agent. In principle, it is possible to employ as the binder any binder known to be suitable for base paints. Polyacrylate resins, alkyd resins, polyester resins and melamine-formaldehyde and urea-formaldehyde resins are mentioned as examples Polyisocyanates, polyepoxides and, preferably, urea-formaldehyde, melamine-formaldehyde and benzoguanamine-formaldehyde condensates are mentioned as examples of crosslinking agents.

Base paints containing, as the binder, a polyacrylate resin and/or an alkyd resin and/or a polyester resin in combination with a melamine-formaldehyde resin are preferred. Polyacrylate resins or alkyd resins or polyester resins or melamine-formaldehyde resins which can be employed are any resins known to be suitable for use in base paints (cf., for example, U.S. Pat. No. 4,477,536).

The cellulose ester present in the base paints employed in accordance with the invention is preferably cellulose acetobutyrate. The cellulose acetobutyrate is so chosen that a solution of 15 parts by weight of the cellulose acetobutyrate or of the mixture of at least two types of cellulose acetobutyrate in 85 parts by weight of a mixture of acetone and ethanol (ratio by weight of acetone to ethanol=9:1) has a viscosity at 23° C. of 200 to 600, preferably 300 to 500, mPa.s It is particularly preferable to employ a mixture of two types of cellulose acetobutyrate (CAB-1 and CAB-2), CAB-1 being distinguished by the fact that a solution of 20 parts by weight of CAB-1 in 80 parts by weight of butyl acetate has a viscosity at 23° C. of 160 to 210 mPa.s, preferably 180 to 200 mPa.s, and CAB-2 being distinguished by the fact that a solution of 20 parts by weight of CAB-2 in 80 parts by weight of butyl acetate has a viscosity at 23° C. of 5000 to 8000, preferably 6500 to 7500, mPa.s. It is possible to employ any type of cellulose acetobutyrate which exhibits the viscosity behavior described above and can be employed in base paints. The polymer microparticles present in the base paints employed in accordance with the invention are crosslinked polymer microparticles such as are known, for example, from DE-A 2,818,100 and U.S. Pat. No. 4,477,536. The preparation of the polymer microparticles is described in detail in these two patent documents.

Preferred base paints are those containing crosslinked polymer microparticles which can be obtained by subjecting a mixture of (A) an ethylenically unsaturated monomer containing one ethylenically unsaturated group per molecule or a mixture of such monomers and (B) an ethylenically unsaturated monomer containing at least two ethylenically unsaturated groups in the molecule or a mixture of such monomers to an emulsion polymerization, and subsequently transferring the aqueous dispersion of polymer microparticles obtained in this way into an organic solvent or a mixture of organic solvents.

The base paints which are particularly preferred are those containing polymer microparticles which have been prepared using components (A) containing ionic and/or polar groups, preferably hydroxyl and/or carboxyl groups. The following are mentioned as examples of components of this type: (meth)acrylic acid, hydroxyethyl (meth)acrylate and hydroxypropyl (meth)acrylate. It is also preferable to crosslink the polymer microparticles to such an extent that the ionic and/or polar groups remain fixed on the surface of the polymer microparticles, even after transfer into an organic solvent or a mixture of organic solvents, and do not orient themselves toward the core of the polymer microparticles.

The components (A) and (B) should contain between 1 and 20, preferably between 3 and 15, % by weight of ionic and/or polar groups. In order to obtain adequately crosslinked polymer microparticles, it is sufficient, as a rule, to employ 0.25 to 1.2, preferably 0.3 to 1, mol of the component (B) for one mole of the component (A).

In addition to the components (A) enumerated above containing hydroxyl and/or carboxyl groups, the following are mentioned as further components (A): alkyl esters of (meth)acrylic acid, in particular alkyl esters of (meth)acrylic acid containing 1 to 4 carbon atoms in the alkyl radical, such as, for example, methyl, ethyl, propyl or butyl (meth)acrylate. It is also possible to employ monomers such as styrene or α-methylstyrene as the component (A).

The following, for example, can be employed as the component (B): allyl (meth)acrylate, ethylene glycol di(meth)acrylate, butanediol di(meth)acrylate, hexanediol di(meth)acrylate or divinyl benzene. The polymer microparticles employed can be prepared by emulsion polymerization of the components (A) and (B) in an aqueous medium in known equipment, for example in a stirred kettle having a device for heating and cooling. The addition of the monomers can be effected by initially taking a solution of the whole of the water, the emulsifier and part of the initiator and slowly adding, at the polymerization temperature, the monomer or mixture of monomers and, separately therefrom, but parallel thereto, the remainder of the initiator. However, it is also possible initially to take part of the water and of the emulsifier and to prepare, from the remainder of the water and of the emulsifier and from the monomer or mixture of monomers, a pre-emulsion which is added slowly at the polymerization temperature, the initiator again being added separately.

The emulsion polymerization process is a process which has already been known for a long time (cf., for example, Chemie, Physik und Technologie der Kunststoffe in Einzeldarstellungen, Dispersionen synthetischer Hochpolymerer ("The Chemistry, Physics and Technology of Plastics in Monographs, Dispersions of Synthetic High Polymers"), Part I by F. Hölscher, Springer Verlag, Berlin, Heidelberg, New York, 1969). The emulsion polymerization in question can be initiated by customary initiators, such as, for example, peroxy compounds, such as ammonium persulfate, potassium persulfate, ammonium or alkali metal peroxydiphosphate and organic peroxides, such as, for example, benzoyl peroxide, organic peresters, such as perisopivalate, in some cases in combination with reducing agents, such as sodium disulfite, hydrazine or hydroxylamine, and catalytic amounts of accelerators, such as iron, cobalt, cerium and vanadyl salts. The emulsion polymerization can also be initiated by means of a redox initiator system composed of $H_2O_2$ and a nonionic, water-soluble reducing agent, (as described in EP-A 107,300).

The following are mentioned as examples of nonionic, water-soluble reducing agents which can be employed: ascorbic acid, sulfur compounds, such as thiourea and mercaptans, amines, such as hydroxylamine, triethylamine and ethanolamine, reducing acids, such as glycolic acid, tartaric acid and diphenyl glycolic acid, and benzyl alcohol. It is preferable to employ ascorbic acid.

The emulsifier employed can be an anionic emulsifier on its own or in a mixture.

Examples of anionic emulsifiers are the alkali metal or ammonium salts of sulfuric acid half-esters of alkylphenols or alcohols, and also the sulfuric acid half-esters of oxyethylated alkylphenols or oxyethylated alcohols, preferably the alkali metal salts of the sulfuric acid half-ester of a nonylphenol which has been reacted with 4–5 mol of ethylene oxide per mole, of an alkylsulfonate or arylsulfonate, sodium laurylsulfate or sodium laurylethoxylate-sulfate, and secondary sodium alkanesulfonates in which the carbon chain contains 8–20 carbon atoms. It is also possible to employ alkali metal or ammonium salts of sulfosuccinic acid half-esters or diesters of sulfosuccinic acid and alcohols having 6–20 carbon atoms. The amount of anionic emulsifier is 0.1–5.0% by weight, relative to the monomers, preferably 0.5–4.0% by weight. It is also possible, in order to increase the stability of the aqueous dispersions, to employ, in addition, a nonionic emulsifier of the type of an ethoxylated alkylphenol or fatty alcohol, for example an addition product of 1 mol of nonylphenol and 4–30 mol of ethylene oxide in the form of a mixture with the anionic emulsifier.

It is preferable to keep the amount of ionic emulsifier employed as small as possible.

The emulsion polymerization is generally carried out at temperatures from 20° to 100° C., preferably 40 to 90° C. The crosslinked polymer microparticles employed in accordance with the invention must have a diameter of 0.01 to 10 μm, preferably 0.01 to 5 μm. It is fundamental to the invention that, in addition to the crosslinked polymer microparticles described above and the cellulose ester or mixture of cellulose esters, the base paints should also contain an epoxidized fatty acid ester or a mixture of epoxidized fatty acid esters. It is particularly preferable to employ epoxidized linseed oil and/or epoxidized soya oil. Furthermore, it is also possible to employ cycloalkyl epoxystearates and n-alkyl epoxystearates, such as, for example, methylepoxystearate, butylepoxystearate and hexylepoxystearate. Epoxidized fatty acid esters have already been known for a long time and are available from a large number of manufacturers.

The base paints according to the invention can contain, as pigments, chromophoric pigments of an inorganic nature, such as, for example, titanium dioxide, iron oxide, carbon black and the like, chromophoric pigments of an organic nature and also customary metallic pigments (for example commercially available aluminum bronzes, alloy steel bronzes, etc.) and nonmetallic effect pigments (for example perlescent or interference pigments) The base paints according to the invention preferably contain metallic pigments and/or effect pigments The level of pigmentation is within customary ranges.

Advantageously, the base paints according to the invention also contain wax (for example ethylene/vinyl acetate copolymer or polyamide) in a disperse form and/or rheology assistants, such as, for example, ureas or bentones.

At the spray viscosity (for instance 28 to 35 seconds efflux time, measured in the ISO-4 cup), the base paints according to the invention preferably have a content of nonvolatile constituents of about 25 to 35% by weight. The content of nonvolatile constituents varies with the pigmentation of the base paints. For base paints containing only metallic pigments, it is preferably between 25 and 30% by weight. For base paints containing metallic pigments and having a light color shade, it is preferably between 25 and 30% by weight. For base paints containing metallic pigments and having a darker color shade, it is preferably between 30 and 35% by weight. In self-colored base paints (i.e. free from metallic pigments), the proportion of nonvolatile constituents is preferably between 30 and 35% by weight.

With the provision of the base paints according to the invention the object mentioned initially is achieved. Qualitatively high-grade paint coatings can be produced by means of the base paints according to the invention even without recoating with a transparent finish.

The base paints according to the invention can be applied to any desired substrates, such as, for example, metal, wood, plastic or paper. Essentially any known method of application, such as, for example, spraying, doctor-blade application, dipping and the like, can be used, spraying being particularly preferred.

The invention is illustrated in greater detail in the following examples. Parts and percentages are by weight, unless anything to the contrary is expressly stated.

1. Preparation of Polymer Microparticles Which Are Employed in Accordance with the Invention 1.1 Polymer Microparticle Dispersion 1

27.673 g of deionized water and 0.121 g of eikosa ethylene glycol nonylphenyl ether (Antarox ® CO 850 made by GAF Corp., emulsifier 1) are initially placed in a cylindrical double-walled glass vessel equipped with a stirrer, a reflux condenser, a stirrable addition vessel, a dropping funnel and a thermometer, and are heated to 80° C. An emulsion is prepared in the stirrable addition vessel from 13.812 g of deionized water, 0.401 g of a 30% strength aqueous solution of the ammonium salt of pentaethylene glycol nonylphenyl ether-sulfate (Fenopon ® EP 110 made by GAF Corp., emulsifier 2), 3.618 g of 1,6-hexanediol diacrylate, 7.719 g of methyl methacrylate and 0.724 g of hydroxypropyl methacrylate. 10% by weight of this emulsion are added to the receiver. 10% by weight of a solution of 0.091 g of ammonium peroxydisulfate (APS) in 7.32 g of deionized water are then added dropwise in the course of 5 minutes. An exothermic reaction sets in. The reaction temperature is kept between 82 and 88° C. 15 minutes after the completion of the addition of the APS solution the remaining 90% by weight of the emulsion are added in the course of 2 hours, and the initiator solution is added in the course of 3 hours, the temperature being kept at 80° C.

After the addition is complete, the reaction mixture is kept for a further hour at 80° C. It is then cooled to at least 40° C. and 18.443 g of n-butanol are added with stirring, and stirring is continued for a further hour. After the stirrer has been switched off, the mixture is allowed to settle out for one hour, the lower aqueous phase is separated off and 20.078 g of n-butyl acetate are added.

The residual water remaining is removed by azeotropic distillation in vacuo. This gives a stable dispersion of polymeric microparticles having a solids content of 30% by weight, an acid number of 5 and a particle size (measured by photon correlation spectroscopy) of 160 nm.

1.2 Polymer Microparticle Dispersion 2

27.673 g of deionized water and 0.121 g of eikosa ethylene glycol nonylphenyl ether (Antarox ® CO 850 made by GAF Corp., emulsifier 1) are initially placed in a cylindrical double-walled glass vessel equipped with a stirrer, a reflux condenser, a stirrable addition vessel, a dropping funnel and a thermometer, and are heated to 80° C. An emulsion is prepared in the stirrable addition vessel from 13.812 g of deionized water, 0.401 g of a 30% strength aqueous solution of the ammonium salt of pentaethylene glycol nonylphenyl ether-sulfate (Fenopon ® EP 110 made by GAF Corp., emulsifier 2), 3.618 g of 1,6-hexanediol diacrylate, 7.719 g of methyl methacrylate and 0.724 g of hydroxypropyl methacrylate. 10% by weight of this emulsion are added to the receiver. 10% by weight of a solution of 0.091 g of ammonium peroxydisulfate (APS) in 7.32 g of deionized water are then added dropwise in the course of 5 minutes. An exothermic reaction sets in. The reaction temperature is kept between 82° and 88° C. 15 minutes after the completion of the addition of the APS solution the remaining 90% by weight of the emulsion are added in the course of 2 hours, and the initiator solution is added in the course of 3 hours, the temperature being kept at 80° C.

After the completion of the addition, the reaction mixture is kept at 80° C. for a further hour. The mixture is then cooled to at least 40° C. and 18.443 g of n-butanol are added with stirring, and stirring is continued for a further hour. After the stirrer has been switched off, the mixture is allowed to settle out for one hour, the lower aqueous phase is separated off and 0.123 g of dimethylethanolamine and 19.955 g of n-butyl acetate are added. The residual water remaining is removed by azeotropic distillation in vacuo. This gives a stable dispersion of polymeric microparticles having a solids content of 30% by weight, an acid number of 5 and a particle size (measured by photon correlation spectroscopy) of 160 nm.

1.3 Polymer Microparticle Dispersion 3

23.238 g of deionized water and 0.099 g of eikosa ethylene glycol nonylphenyl ether (Antarox ® CO 850 made by GAF Corp., emulsifier 1) are initially placed in a cylindrical double-walled glass vessel equipped with a stirrer, a reflux condenser, a stirrable addition vessel, a dropping funnel and a thermometer, and are heated to 80° C. An emulsion is prepared in the stirrable addition vessel from 10.780 g of deionized water, 0.329 g of a 30% strength aqueous solution of the ammonium salt of pentaethylene glycol nonylphenyl ether-sulfate (Fenopon ® EP 110 made by GAF Corp., emulsifier 2), 2.967 g of 1,6-hexanediol diacrylate, 6.330 g of methyl methacrylate and 0.594 g of hydroxypropyl methacrylate. 10% by weight of this emulsion are added to the receiver. 10% by weight of a solution of 0.075 g of ammonium peroxydisulfate in 6.003 g of deionized water are then added dropwise in the course of 5 minutes. An exothermic reaction sets in. The reaction temperature is kept between 82 and 88° C. 15 minutes after the completion of the addition of the APS solution the remaining 90% by weight of the emulsion are added in the course of 2 hours, and the initiator solution is added in the course of 3 hours, the temperature being kept at 80° C.

After the completion of the addition, the reaction mixture is kept at 80° C. for a further hour. The mixture is then cooled to a least 40° C. and 15.125 g of n-butanol are added with stirring, and stirring is continued for a further hour. After the stirrer has been switched off, the mixture is allowed to settle out for one hour, the lower aqueous phase is separated off and 24.430 g of a 75% strength solution of an acrylate resin prepared in accordance with Example 11 of EP-B 119,051 and 10.030 g of n-butyl acetate are added. The residual water remaining is removed by azeotropic distillation. This gives a stable polymer microparticle dispersion having a solids content of 50% by weight.

2. Preparation of Base Paints According to the Invention

2.1 Preparation of a Preproduct A 296 g of a 7 percent strength by weight dispersion of a copolymer prepared from 85 to 95% by weight of ethylene and 15 to 5% by weight of vinyl acetate (for example EVA-1 made by BASF AG) is initially taken, in a mixture of xylene and butyl acetate (mixing ratio 1:1). 566 g of the polymer microparticle dispersion 1 are added to this dispersion with vigorous treatment in a dissolver. The mixture thus obtained is subjected to dissolver treatment for 15 minutes. 495 g of a 75% strength by weight solution of an acrylate resin prepared in accordance with Example 11 of EP-B 119,051 are then added with vigorous mixing and treatment in a dissolver is continued for a further 15 minutes. 213 g of a 90% strength solution in xylene of an epoxidized soya oil having an acid number as specified by DIN 53 183 of not more than 1 and having a viscosity of 160 to 300 mPa.s (20° C., D=344 s$^{-1}$) (Uralac ® 303-X-90 made by DSM-Resins) are then mixed in slowly. The preproduct thus obtained has a viscosity of 55 mPa.s.

2.2 Formulation of a Base Paint Having a Silver Color Shade 320 g of preproduct A are initially taken and mixed, with vigorous stirring, with 152 g of a 15 percent strength by weight solution of a first type of cellulose acetobutyrate (Eastman cellulose acetobutyrate 381.05) in butyl acetate and 40 g of a 15 percent strength by weight solution of a second type of cellulose acetobutyrate (Bayer AG BP 900) in butyl acetate. 130 g of a 60 percent strength by weight solution in a 4:1 mixture of xylene and n-butanol of an acrylate resin prepared in accordance with Example 1 of German Offenlegungsschrift 3,041,648, 78 g of a 50 percent strength by weight solution in isobutanol of a melamine-formaldehyde resin (Hoechst Maprenal ® MF 650) and 80 g of a 50 percent strength by weight suspension of aluminum pigment in butyl acetate are then added. The base paint thus obtained has an efflux time of 50 sec. in a DIN-4 cup.

2.3 Preparation of a Black Pigment Caste 976 g of a 60 percent strength by weight solution in a 4:1 mixture of xylene and n-butanol of an acrylate resin prepared in accordance with Example 1 of German Offenlegungsschrift 3,041,648, 226 g of xylene and 236 g of butyl acetate are mixed in a dissolver. 52.5 g of FW2 carbon black (Degussa) are then added with stirring and the mixture is treated in a dissolver for 30 minutes. The paste is ground in a sand mill until the particle size is about 5 μm.

2.4 Formulation of a Base Paint Having a Black Color Shade 176 g of the paste prepared as in 2.3 are initially taken and mixed with 320 g of preproduct A, with vigorous stirring. 66 g of a 15 percent strength by weight solution in butyl acetate of cellulose acetobutyrate 381.05 (Eastman) and 40 g of a 15 percent strength by weight solution in butyl acetate of BP 900 (Bayer AG) are then added with vigorous stirring cf. 2.2). 97 g of a 60 percent strength by weight solution in a 4:1 mixture of xylene and n-butanol of an acrylate resin prepared in accordance with Example 1 of German Offenlegungsschrift 3,041,648, 90 g of a 50 percent strength by weight solution in isobutanol of a melamine-formaldehyde resin (Hoechst Maprenal MF 650) and 11 g of a 50 percent strength by weight suspension of aluminum pigment in butyl acetate are then added.

3. Preparation of Two-layer Metallic Effect Paint Coatings Using the Base Paints, According to the Invention, of 2.2 and 2.4

The efflux time in the ISO-4 cup is adjusted to 35 sec. with butyl acetate.

The base paint thus obtained is applied, in two coats, by means of an automatic painting machine to a metal sheet which has been electrocoated and coated with a filler. After exposure to air for 3 minutes, the sheet is overcoated with a commercially available clear coat and baked for 20 minutes at 140° C.

4. Assessment of the Metallic Effect Paint Coatings

| Base paint used as in | Content of nonvolatile constituents (1 h, 130° C.) | Resistance to incipient re-dissolution/blushing | Top coat appearance | Metallic effect |
|---|---|---|---|---|
| 2.2 | 27% by wt. | 1[2] | 1[2] | 2[2] |
| Comparison[1] | 19% by wt. | 1 | 2 | 2 |
| 2.4 | 35% by wt. | 1 | 1 | — |
| Comparison[1] | 24% by wt. | 2 | 2 | — |

[1]Two-layer paint coatings which had been prepared using commercially available base paints (silver and black) were used as a comparison.
[2]Rating: 1 = very good, 5 = unusable

We claim:

1. A process for the production of a multi-layer paint coating on a surface of a substrate, comprising
   (1) applying a liquid, pigmented base paint containing at least one binder, crosslinked polymer microparticles, and a cellulose ester to the surface of the substrate;
   (2) forming a base coat from the liquid, pigmented bas paint applied in state (1):
   (3) then applying a transparent finish to the base coat thus obtained; and then
   (4) the base is baked, together with the transparent finish;

wherein the base paint contains 5 to 20 percent by weight of crosslinked polymer microparticles, 2 to 15 percent by weight of a cellulose acetobutyrate or of a mixture of at least two different cellulose acetobutyrates, and 5 to 20 percent by weight of an epoxidized fatty acid ester or of a mixture of epoxidized fatty acid esters, based on the total weight of nonvolatile constituents, excluding pigments and inorganic fillers, wherein the crosslinked polymer microparticles are obtained by subjecting a mixture of
   (A) an ethylenically unsaturated monomer containing only one ethylenically unsaturated group per molecule or a mixture of such monomers; and
   (B) an ethylenically unsaturated monomer containing at least two ethylenically unsaturated groups in the molecule or a mixture of such monomers;

to an emulsion polymerization, and subsequently transferring an aqueous dispersion of polymer microparticles obtained in this way into an organic solvent or a mixture of organic solvents, and wherein the cellulose acetobutyrate or mixture of cellulose acetobutyrates is so chosen that a 15% by weight solution in a mixture of acetone and ethanol (9:1 by weight) has a viscosity of 200 to 600 mPa.s at 23° C.

2. The process of claim 1, wherein the base paint further contains metallic pigments.

3. The process of claim 1, wherein the epoxidized fatty acid ester employed comprises epoxidized linseed oil, epoxidized soya oil, or a mixture thereof.

4. A liquid base paint for production of a base coat of a multi-layer paint coating, which liquid base paint contains pigments, at least one binder, crosslinked polymer microparticles, and cellulose acetobutyrate, wherein the base paint contains 5 to 20 percent by weight of crosslinked polymer microparticles, 2 to 15 percent by weight of a cellulose acetobutyrate or of a mixture of at least two different cellulose acetobutyrates, and 5 to 20 percent by weight of an epoxidized fatty acid ester or of a mixture of epoxidized fatty acid esters, based on the total weight of nonvolatile constituents, excluding pigments and inorganic fillers, wherein the crosslinked polymer microparticles are obtained by subjecting a mixture of
   (A) an ethylenically unsaturated monomer containing only one ethylenically unsaturated group per molecular or a mixture of such monomers; and
   (B) an ethylenically unsaturated monomer containing at least two ethylenically unsaturated groups in the molecule or a mixture of such monomers;

to an emulsion polymerization, and subsequently transferring an aqueous dispersion of polymer microparticles obtained in this way into an organic solvent or a mixture of organic solvents, and wherein the cellulose acetobutyrate or mixture of cellulose acetobutyrates is so chosen that a 15% by weight solution in a mixture of acetone and ethanol (9:1 by weight) has a viscosity of 200 to 600 mPa.s at 23° C.

5. The base paint of claim 4, wherein the base paint further contains metallic pigments.

6. The base paint of claim 4, wherein the epoxidized fatty acid ester employed comprises epoxidized linseed oil, epoxidized soya oil, or a mixture thereof.

7. The base paint of claim 4, wherein the crosslinked polymer microparticles contain at least one member selected from the guorp consisting of hydroxyl groups and carboxyl groups.

* * * * *